United States Patent [19]
Hoff

[11] Patent Number: 5,150,954
[45] Date of Patent: Sep. 29, 1992

[54] PAGER WATCH SYSTEM UTILIZING TIME SLOT COMMUNICATION

[75] Inventor: Don G. Hoff, Tiburon, Calif.

[73] Assignees: Seiko Corp.; Seiko Epson Corp., Japan

[21] Appl. No.: 581,431

[22] Filed: Sep. 12, 1990

Related U.S. Application Data

[63] Continuation of Ser. No. 336,645, Apr. 7, 1989, abandoned, which is a continuation of Ser. No. 49,045, May 11, 1987, abandoned, which is a continuation of Ser. No. 678,603, Dec. 5, 1984, abandoned.

[51] Int. Cl.⁵ .............................................. H04Q 1/00
[52] U.S. Cl. .......................... 340/825.44; 340/825.48; 455/181.1; 455/343; 370/82; 370/95.1; 379/60
[58] Field of Search ....................... 340/825.44, 825.48; 455/181, 343; 370/82, 83, 95.1; 379/60; 368/47

[56] References Cited

U.S. PATENT DOCUMENTS

| | | | |
|---|---|---|---|
| 3,032,651 | 5/1962 | Gisiger-Stahli et al. | 455/351 X |
| 3,851,251 | 11/1974 | Wigner et al. | 325/55 |
| 3,861,134 | 1/1975 | Chacon et al. | |
| 3,937,004 | 2/1976 | Natori et al. | 58/152 B |
| 4,086,537 | 4/1978 | Asakawa et al. | |
| 4,131,855 | 12/1978 | Hamagawa | 368/47 X |
| 4,315,332 | 2/1982 | Sakami et al. | 368/47 X |
| 4,317,220 | 2/1982 | Martin | 455/58 |
| 4,337,463 | 6/1982 | Vangen | 368/47 X |
| 4,358,836 | 11/1982 | Tohyama et al. | 368/47 |
| 4,369,443 | 1/1983 | Giallanza et al. | 340/825.47 |
| 4,383,257 | 5/1983 | Giallanza et al. | 340/825.47 |
| 4,398,192 | 8/1983 | Moore et al. | 340/825.44 |
| 4,419,765 | 12/1983 | Wycoff et al. | 455/36 |
| 4,437,095 | 3/1984 | Akahori et al. | 340/825.44 |
| 4,440,501 | 4/1984 | Schulz | 368/47 |
| 4,569,598 | 2/1986 | Jacobs | 368/47 |
| 4,668,949 | 5/1987 | Akahori et al. | 340/825.44 |

FOREIGN PATENT DOCUMENTS

| | | |
|---|---|---|
| 0124788 | 11/1984 | European Pat. Off. |
| 0177971 | 4/1986 | European Pat. Off. |
| 2606691 | 9/1977 | Fed. Rep. of Germany |
| 2918531 | 11/1980 | Fed. Rep. of Germany |
| 2232006 | 12/1974 | France |

Primary Examiner—Donald J. Yusko
Assistant Examiner—Brian Zimmerman
Attorney, Agent, or Firm—Elmer Galbi

[57] ABSTRACT

A method and apparatus for transmitting paging and absolute time information to, and receiving such information at, a remote portable electronic timepiece and pager unit during a short time slot assigned to the pager unit is disclosed. In the pager unit, an oscillator is coupled to a timer which produces a time display. These functions are constantly powered. The timer periodically causes power to be supplied to a receiver and message decoding components of the pager unit during a short time slot in which transmitted data is to be received. The receiver detects and reconstitutes a transmitted signal. The transmitted signal is processed through a decoder which extracts paging and time update data. If the paging data includes the pager unit's ID number, the unit indicates that a page has been received. The time update data extracted from the transmitted signal is used to synchronize a timer in the pager unit. The timer provides an accurate time indication for the watch function. The same timer additionally determines when power is supplied to the pager unit's receiver and message decoder components so that they will be powered during the short time slot.

4 Claims, 2 Drawing Sheets

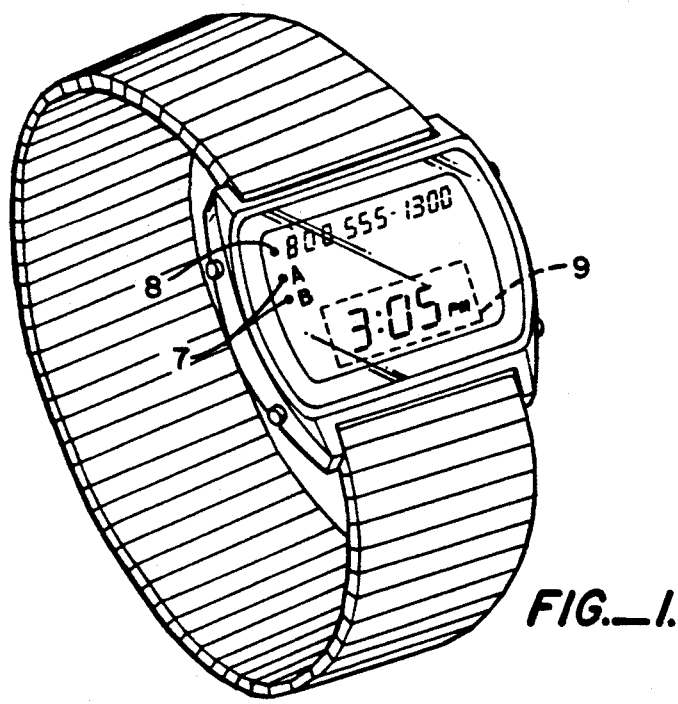
FIG._1.
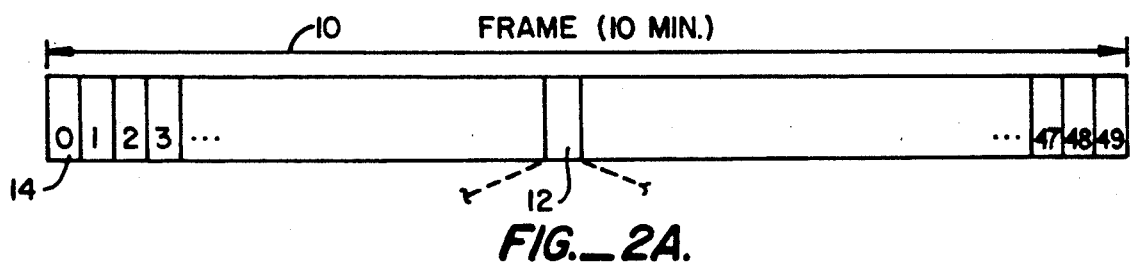
FIG._2A.
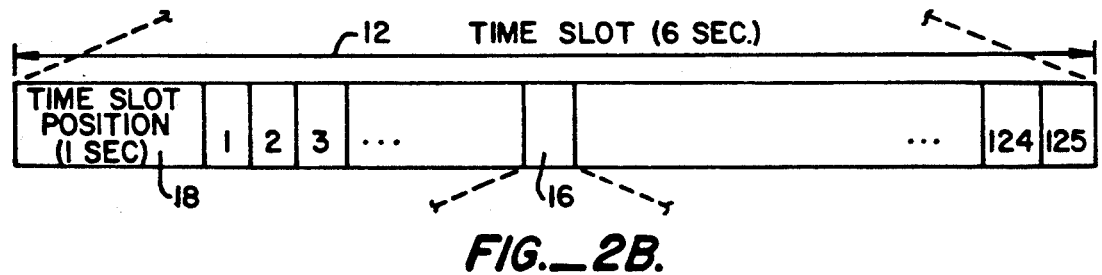
FIG._2B.
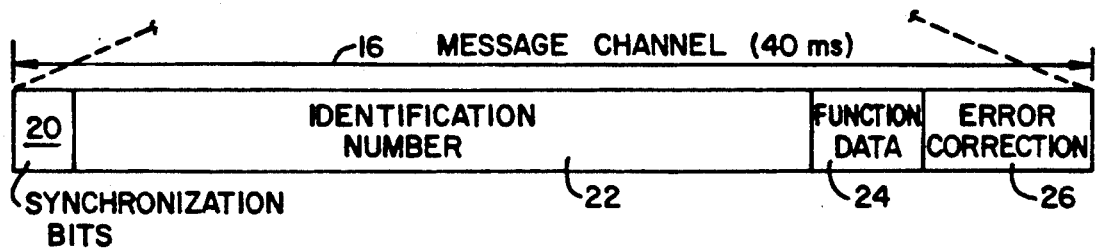
FIG._2C.

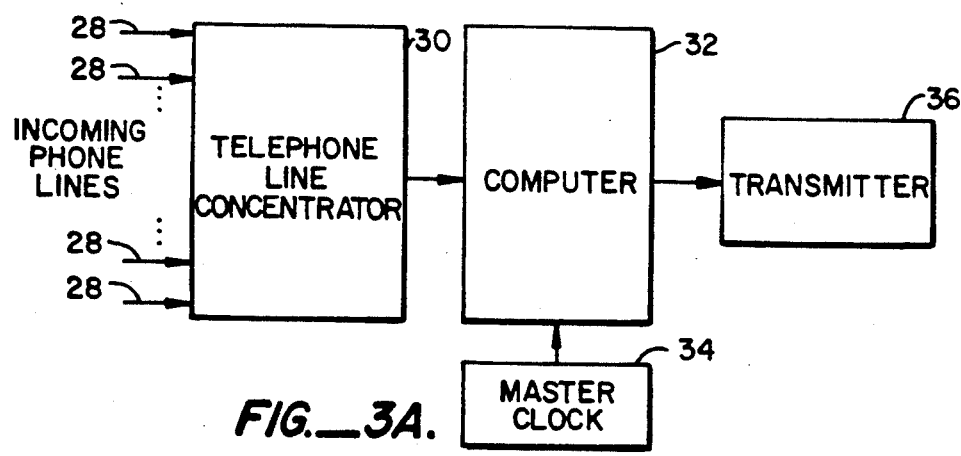
FIG._3A.
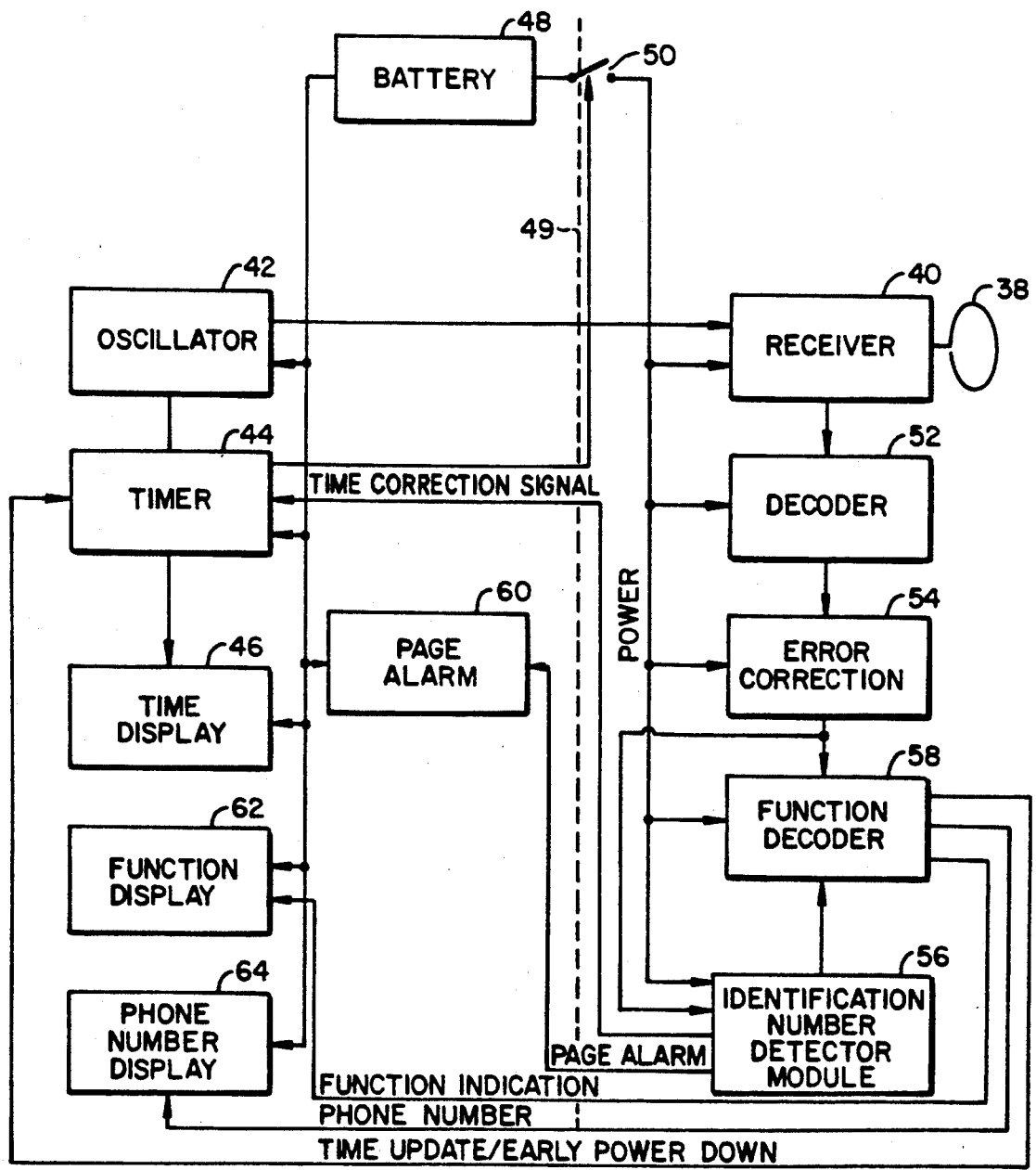
FIG._3B.

PAGER WATCH SYSTEM UTILIZING TIME SLOT COMMUNICATION

This application is a continuous of U.S. Ser. No. 07/336645 filed Apr. 7, 1989, now abandoned, which is a continuation of U.S. Ser. No. 07/049045 filed May 11, 1987, now abandoned, which is a continuation of U.S. Ser. No. 06/678603 filed Dec. 5, 1984, now abandoned.

BACKGROUND OF THE INVENTION

The invention relates to the field of paging systems utilizing battery powered portable pagers.

Paging systems have used various methods for reducing the power consumption of battery-operated portable pagers in order to miniaturize the pager unit. One such approach involves supplying power to the receiver circuitry only during predetermined time slots in which data relating to the particular pager unit is broadcast. In the absence of accurate synchronization between the transmitter and receiver, a long time slot is required to insure that the pertinent data is received and thus more power is consumed.

Apart from paging systems there are methods by which a clock can be remotely reset by a transmitted signal. Tohyama et al., U.S. Pat. No. 4,358,836, for example, shows a method for setting a watch from a transmitted time announcement signal.

A combination of a pager utilizing time slot transmission with a resettable watch is shown by Natori et al., U.S. Pat. No. 3,937,004. The Natori system shows a watch controlled by a counter which is periodically reset by a transmitted signal. The use of an internal counter allows errors to accumulate since the counter will have some amount of error, and the error in each count will be added to the time indication. Thus, the watch may stray from the correct time. This straying requires the use of a large time slot to accommodate errors in the time when the pager's receiver is powered up.

SUMMARY OF THE INVENTION

The present invention is a method and apparatus for transmitting paging and time information from a central station and receiving such information at a remote electronic timepiece and pager unit during a short time slot assigned to the pager unit. In the pager unit, an oscillator is coupled to a timer which produces a time display. These functions are constantly powered. The timer periodically causes power to be supplied to the receiver and message decoding components, during a short time slot in which the transmitted data is to be received. The receiver detects and reconstitutes the transmitted signal. The transmitted signal is processed through a decoder which extracts paging and time update data. If the paging data includes the pager unit's ID number, the unit audibly and/or visually indicates to the user that a page has been received.

The time update data extracted from the transmitted signal is used to synchronize the timer in the pager unit. The timer serves the dual function of providing an accurate time indication for the watch function as well as causing power to be supplied during the time slot as described.

By transmitting time update information rather than resetting an internal counter, the watch function is accurately synchronized and will not stray. Because the timer which is synchronized powers up the receiver during the pager unit's assigned time slot in addition to indicating the correct time, a very short time slot can be used.

In the preferred embodiment, the unit corrects its time slot alignment by comparing the transmitted time slot position to its assigned time slot position. If they do not match, this means the timer has caused the receiver circuit to be powered at the wrong time, so the timer is adjusted by the difference in time between the received time slot and its assigned time slot. The timer will thereafter cause the receiver circuit to be powered up during its assigned time slot.

In the preferred embodiment, if a time slot is not filled with data, an end of message signal instructs the pager unit to power down early, thereby achieving an additional reduction in power consumption beyond the reduction achieved by only powering the receiver circuit during short time slots. Because of its low cost, compactness and thus possible widespread use, the present invention could be used in a system where the employer of the person to be paged (an office, hospital, etc.) is the subscriber, or in a broader system, such as where each person with a pager watch is a subscriber and can be called by anyone.

BRIEF DESCRIPTION OF THE DRAWINGS

FIG. 1 is a perspective view of a preferred embodiment of the pager watch of the present invention.

FIG. 2A-2C is a time slot diagram of the preferred embodiment of the time slot format of the present invention.

FIG. 3A is a time slot block diagram of the preferred embodiment of the transmitter station of the present invention.

FIG. 3B is a block diagram of the preferred embodiment of the timepiece and pager unit.

DESCRIPTION OF THE PREFERRED EMBODIMENT

FIG. 1 illustrates a pager watch according to the invention. The watch face shows a number of indicator lights 7 which can be assigned to predefined messages, such as "call home," "call the office," etc. The digital display 8 may show a phone number to be called. In addition, the display 9 indicates a time and any other functions of a normal wristwatch.

The preferred embodiment of the invention is best understood with reference to a specific transmission data format, although a number of data formats could be used. FIG. 2 shows a preferred time slot frame format for a transmitted signal. A time frame (FIG. 2A) indicated by bidirectional arrow 10 is composed of 100 time slots such as the one indicated at 12. In the preferred embodiment, the length of the time frame is 10 minutes, with each time slot thus being 6 seconds long. The time frame is reinitiated every 10 minutes. The first, or "0", time slot, indicated at 14, contains time update information. The remaining time slots, numbered 1-99, contain paging information in the format shown in expanded time slot 12.

Time slot 12 is composed of up to 125 identical message channels (FIG. 2B) such as the one represented at 16 plus an initial time slot address channel, represented at 18. The time slot address is a digital representation of one of the numbers 0 through 99, depending on which time slot is represented. Each message channel is 40 milliseconds in length, except the time slot address channel, which is 1 second long.

Message channel 16 is shown in expanded form in FIG. 2C. A first portion 20 of message channel 16 contains synchronization bits. A second portion 22 contains the identification number for a particular timepiece-pager unit. A third portion 24 contains function data indicating the type of message to be indicated on the face of the timepiece-pager unit. Alternately, the function data could indicate that the next message channel contains a phone number to be displayed, rather than an identification number. A last portion 26 of the message channel contains error correction data.

FIG. 3A is a block diagram of a transmitting system at a central paging site. The transmission of the paging information in the present invention could be achieved in a variety of manners, such as by using traditional low-power transmissions, by using FM or AM sideband channels or by using the TV vertical blanking interval. As shown in FIG. 3A, a series of incoming phone lines 28 provide paging data to a telephone line concentrator 30. Concentrator 30 buffers the relatively slow data coming from a caller in the form of Dual-Tone Multi-frequency (DTMF) signals. The system can be totally automatic, with no operators or dispatchers. Calls can be prompted by computer voice messages which ask for the caller's subscriber identification number (the user's office, hospital, etc., if applicable), the page ID number of the person to be paged, a predetermined message function number (to indicate "call office," etc.), and an optional phone number. The information is then given to a computer 32, which numerically sorts the messages by ID number and packs them into their assigned time slots. Blocks of data are evaluated and error correction data is added to each block by computer 32. Computer 32 is connected to a master clock 34, and when the master clock reference time reaches a particular time slot, the block of data for such time slot is broadcast by a transmitter 36 after being encoded for an appropriate modulation scheme, such as frequency shift keying. In the preferred embodiment, transmitter 36 is an FM transmitter and the block of data is used to modulate a subcarrier channel of the FM broadcast band.

If a particular time slot is not filled with data, computer 32 will append an end of message code after the last unit of data in the time slot which will instruct the individual pager units to power down early. The computer can also perform other functions, such as preparing billing data for pager subscribers.

FIG. 3B shows a block diagram of the preferred embodiment of a timepiece and pager unit. A wrist loop antenna 38 picks up the transmitted signal and is connected to a receiver 40. Receiver 40 is tuned to the transmission frequency by an oscillator 42. Oscillator 42 is also connected to a timer 44. Timer 44 provides a time signal to a watch face time display 46. Oscillator 42, timer 44, and watch face time display 46 are constantly powered by a battery 48 (as are the displays discussed later). The receiver and decoding components of the pager unit, which are to the right of dotted line 49, are only supplied power when timer 44 provides an enable signal to a switch 50. The timer is programmed to send such an enable signal only during a time slot assigned to the pager unit. The pager unit may, for example, be assigned to time slot 12 shown in FIG. 2.

The signal supplied to receiver 40 is reconstituted as a digital signal. The reconstituted digital signal is then supplied to a decoder 52 which converts it into its original digital format. The digital, information is then processed through an error correction circuit 54 and any detected errors are corrected. The corrected data is then applied simultaneously to an identification number detector module 56 and to a function decoder 58. Module 56 determines whether the correct time slot position has been received and then examines each pager unit ID number received to determine whether it matches the ID number assigned to the receiving pager unit.

In the event the received time slot address does not match the pager unit's assigned time slot position, module 56 calculates the time until the correct time slot by subtracting the received time slot position from the pager unit's assigned time slot position and sends a correction signal to timer 44 causing the timer to open switch 50, thereby removing power from the receiver and message decoding components, until such correct time slot.

Function decoder 58 is only enabled by module 56 in the event there is a match between a received ID number and the pager unit's ID number. If there is a time slot match and an ID number match for the individual pager unit, module 56 will send an enable signal to a page alarm 60. Module 56 will then also enable the output of function decoder 58, which will determine the function following the pager ID number and send a signal to one of a plurality of watch function displays 62.

If the function data indicates that a preassigned message on the watch face should be illuminated, function decoder 58 will send an enable signal to the appropriate one of displays 62. If the function data indicates that a phone number follows in the next message channel, the decoder output will be enabled for the next message channel and then will transmit the received phone number to a watch phone number display 64.

If module 56 and decoder 58 receive a message for early shutdown because there are no more data messages in the time slot, decoder 58 will send a signal to timer 44 indicating that power to the receiver and message decoding components should be removed. Timer 44 will then activate switch 50 and remove power to the receiver and message decoding components of the pager unit.

If the time slot address received is the first address "0", which is assigned for time update information, decoder 52, error corrector 54 and function decoder 58 will decode the time update information and send an update signal to timer 44 which will set the timer to the correct time.

In operation, an individual pager unit is programmed to provide power to its receiver and message decoding components only during its assigned time slot. By only being turned on in 1 out of 100 time slots every 10 minutes, power consumption is reduced by a ratio of 100 to 1. After powering-up and receiving the transmitted signal, the pager unit first compares its assigned time slot position with the time slot position appearing in the first channel of the time slot, time slot position 18 in FIG. 2. In the preferred embodiment, this first message channel would be one second long, and the time slot position would appear either at the end of the time slot address channel or be repeated throughout. Thus, the timepiece and pager unit can drift by up to approximately one second every 10 minutes or approximately 144 seconds a day and still be sufficiently synchronized to receive paging information because the time is corrected with the time data update every 10 minutes.

If the pager unit determines that it has turned on during the wrong time slot, it will calculate the difference between the time slot position detected and its assigned time slot position. The pager unit will then power down and later power up again during the correct time slot.

In theory a pager unit only needs to power up long enough to receive its paging information, so that a time frame could be divided into a larger number of small time slots, each representing a single pager unit, instead of larger time slots to which are assigned a block of pager units. However, current cost-effective consumer electronics technology cannot maintain the degree of timer accuracy needed to achieve such a precise alignment.

As described above, each pager unit also powers up during the initial time slot in order to receive time update information To achieve additional power savings, a pager unit might only power up during this initial time slot in the event it has sprayed from its assigned time slot, while using the time at which it receives the time slot position to provide minor corrections to the timer.

If there is a low volume of paging messages, such that a time slot is not completely filled with data, the message channel after the last message channel containing data would contain a power down message. This would instruct the individual pagers to turn off power for the remaining time of the time slot since there is no additional information in the remaining time of the time slot. Thus, if an end of message signal appears after four seconds into the six second time slot, an additional power savings of one-third realized.

Upon recognition of its ID number an individual timepiece and pager unit would emit a sound to alert the user that a page has been received. Function data would then follow and could contain instructions to illuminate an assigned marker for a predefined message such as "call home" or "call the office," etc., or could indicate that the next message channel contains a phone number which is to be displayed on the face of the timepiece and pager unit.

Additional features can be added to the present invention to enhance its capabilities or reduce the power consumption. For instance, individual pager units can be programmed to shut off during off hours such as after midnight and before seven in the morning. In another variation, if an individual subscriber did not want to have a delay of 10 minutes before receiving a paging message, that paging unit could be assigned to two time slot positions so that at most there would be a 5 minute delay before receiving a page message.

As will be understood by those familiar with the art, the present invention may be embodied in other specific forms without departing from the spirit or essential characteristics thereof. Accordingly, disclosure of the preferred embodiment of the present invention is intended to be illustrative, but not limiting, of the scope of the invention, which is set forth in the following claims.

We claim:

1. A paging system for selectively communicating information to a plurality of receivers, comprising:
   means for transmitting successive frames of information, each of said frames having substantially the same duration and being divided into a plurality of time slots, each time slot having a time reference point, selected time slots having an associated time slot number corresponding to the time reference point thereof,
   a plurality of receivers for receiving said information, each of said receivers being associated with one of said selected time slots,
   the time slot number of said selected time slots being transmitted during the associated time slot,
   means for normally maintaining each of said receivers in an inactive power state and for periodically activating each of said receivers for an activation interval to receive information transmitted during the associated time slot, the periodicity of said activation interval corresponding to the occurrence of said associated time slot, each activation interval having a time reference point corresponding to initiation thereof,
   means for interrogating the information received by a given receiver and for comparing the received time slot number with the time slot number associated with the given receiver, and
   means in each of said receivers for changing the associated activation interval time reference point in response to comparison of the received time slot number with the time slot number associated with said receiver,
   whereby a receiver can determine if it has been activated during its associated time slot and if not it can calculate the amount of change needed in its activation interval time reference point to cause said receiver to be activated during its associated time slot.

2. The system recited in claim 1 wherein a registration number identifying a particular one of said receivers and other information intended for said particular receiver are transmitted during a time slot associated with said particular one of said receivers, whereby said particular one of said receivers can both determine if it has turned on during the associated time slot and also whether information transmitted during the associated time slot was intended for the particular receiver.

3. The system recited in claim 1 wherein said transmitter means includes queuing means for messages, said queuing means includes means for segmenting paging messages intended for one of said receivers into first and second message packages of a minimum length for transmission within corresponding first and second time slots, and also including means for transmitting in the first message packet data temporarily associating the second time slot with said one of said receivers to provide the second message packet prior to the next associated first time slot whereby mutlipacket messages can be quickly transmitted.

4. The system recited in claim 1 wherein said means for transmitted successive frames of information is adapted to transmit said frames as a periodic transmission wherein a substantially fixed time offset exists between time slots similarly positioned within each frame.

* * * * *